United States Patent
Jain et al.

(10) Patent No.: US 11,651,131 B2
(45) Date of Patent: May 16, 2023

(54) GLITCH SOURCE IDENTIFICATION AND RANKING

(71) Applicant: Synopsys, Inc., Mountain View, CA (US)

(72) Inventors: Vaibhav Jain, Cupertino, CA (US); Solaiman Rahim, San Francisco, CA (US); Myunghoon Yoon, Sunnyvale, CA (US); Qing Su, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 66 days.

(21) Appl. No.: 17/335,976

(22) Filed: Jun. 1, 2021

(65) Prior Publication Data

US 2021/0406438 A1 Dec. 30, 2021

Related U.S. Application Data

(60) Provisional application No. 63/045,012, filed on Jun. 26, 2020.

(51) Int. Cl.
*G06F 30/3312* (2020.01)
*G06F 119/06* (2020.01)
*G06F 119/12* (2020.01)

(52) U.S. Cl.
CPC ...... *G06F 30/3312* (2020.01); *G06F 2119/06* (2020.01); *G06F 2119/12* (2020.01)

(58) Field of Classification Search
USPC ....................................... 716/108
See application file for complete search history.

(56) References Cited

U.S. PATENT DOCUMENTS

| | | | |
|---|---|---|---|
| 2004/0136445 A1* | 7/2004 | Olson | H04B 1/71052 375/346 |
| 2007/0094623 A1* | 4/2007 | Chen | G01R 31/31721 716/139 |
| 2007/0277144 A1* | 11/2007 | Veller | G06F 30/33 716/108 |
| 2019/0227885 A1* | 7/2019 | Mutnury | G11C 29/42 |
| 2021/0406438 A1* | 12/2021 | Jain | G06F 30/3312 |

\* cited by examiner

*Primary Examiner* — Mohammed Alam
(74) *Attorney, Agent, or Firm* — Patterson + Sheridan, LLP

(57) ABSTRACT

Glitch source identification and ranking is provided by: identifying a plurality of glitch sources in a circuit layout; back referencing the plurality of glitch sources to corresponding lines in a Resistor Transistor Logic (RTL) file defining the plurality of glitch sources; identifying, in the circuit layout, a plurality of glitch terminuses associated with the plurality of glitch sources; determining a plurality of glitch power consumption values associated with the plurality of glitch sources based on fanouts in the circuit layout extending from the plurality of glitch sources to the plurality of glitch terminuses; ranking, by a processor, the plurality of glitch sources based on corresponding glitch power consumption values of the plurality of glitch power consumption values corresponding to individual glitch sources of the plurality of glitch sources; and reporting the corresponding lines in the RTL file associated with the ranked plurality of glitch sources.

20 Claims, 5 Drawing Sheets

GLITCH SOURCE IDENTIFICATION AND RANKING

CROSS-REFERENCES TO RELATED APPLICATIONS

The present disclosure claims priority to U.S. Provisional Application No. 63/045,012 filed Jun. 26, 2020, which is hereby expressly incorporated by reference herein in its entirety as if fully set forth below and for all applicable purposes

TECHNICAL FIELD

The present disclosure relates to logic gates and the construction and/or routing of electrical circuits that include logic gates.

BACKGROUND

Glitch power is a considerable component of total power expended in logic gates (in some cases from 10% to 40% of total power). Glitches are typically produced due to unbalanced delays and the width of the glitches depends on delays and activity in the logic gates. These glitches are generated in a source, and propagate to the downstream logic gates. Typically, a small number of the glitch sources (e.g., 10%) lead to a majority of the total glitch power (e.g., 90%).

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

SUMMARY

Figure 1:
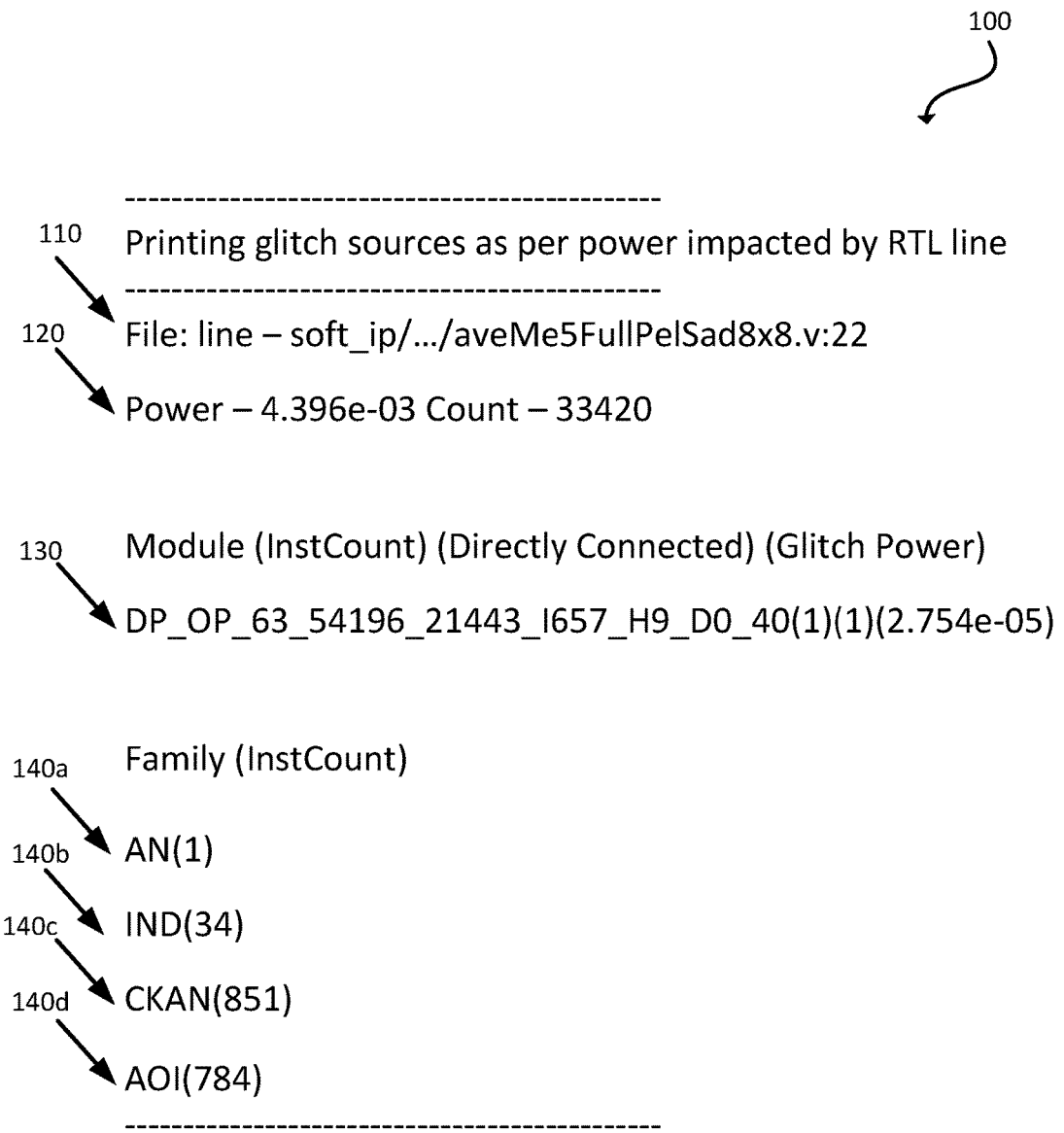
FIG. 1 illustrates results from a glitch source identification and ranking, according to embodiments of the present disclosure.

In one embodiment, the present disclosure provides a method comprising: identifying a plurality of glitch sources in a circuit layout; back referencing the plurality of glitch sources to corresponding lines in a Resistor Transistor Logic (RTL) file defining the plurality of glitch sources; identifying, in the circuit layout, a plurality of glitch terminuses associated with the plurality of glitch sources; calculating determining a plurality of glitch power consumption values associated with the plurality of glitch sources by traversing based on fanouts in the circuit layout extending from the plurality of glitch sources to the plurality of glitch terminuses; ranking, by a processor, the plurality of glitch sources based on corresponding glitch power consumption values of the plurality of glitch power consumption values corresponding to individual glitch sources of the plurality of glitch sources; and reporting the corresponding lines in the RTL file associated with the ranked plurality of glitch sources.

In one embodiment, the present disclosure provides a non-transitory computer-readable storage medium including instructions that when executed by a processor enable performance of a method, comprising: identifying glitch sources in a circuit layout; tracing the glitch sources to corresponding glitch terminuses; calculating a glitch power consumed from each of the glitch sources to the corresponding glitch terminuses; and providing a ranked report of the glitch sources based on total glitch power calculated from each of the glitch sources to the corresponding glitch terminuses.

In one embodiment, the present disclosure provides a system comprising: a memory storing instructions; and a processor, coupled with the memory and to execute the instructions, the instructions when executed cause the processor to: identify glitch sources in a circuit layout; trace the glitch sources to corresponding glitch terminuses; calculate a glitch power consumed between each of the glitch sources to the corresponding glitch terminuses; and provide a ranked report of the glitch sources based on total glitch power calculated from each of the glitch sources to the corresponding glitch terminuses.

DETAILED DESCRIPTION

Aspects described herein relate to glitch source identification and ranking. To reduce and fix glitch power, a glitch analysis system identifies the sources of the glitches and ranks them based on the extra power generated by that glitch source in the layout compared to glitch-free operation of the affected logic gates.

Controlling for power consumption of electronic design is an important piece of design flow, and glitch power is one of the main components of total power consumption. Especially when moving to lower geometries (e.g., when dealing with cells closer to the transistor level of representation), controlling glitch power has become increasingly important for controlling power consumption. Glitches are generated at the output of a logic gate due to imbalances in the timing path at the input of that gate resulting in input pulses that consume extra dynamic power. The width of the input pulse can be a factor of the delays and activity at the input of the gate. The pulse is then propagated in the downstream logic leading to additional dynamic power consumption for this logic. The pulse eventually narrows down and stops propagating, which leads to difficulties in identifying the root cause of the glitch.

For designers to make architecture level changes in the Resistor Transistor Logic (RTL) to reduce glitch power, fix glitches during implementation, or fix a glitch during a power Engineering Change Order (ECO) at the gate level, the designer can identify the source of the glitch and estimate the resulting glitch power consumption from that source. Once the source and total power consumption values for the glitches are known, the designer can then focus on the most problematic glitch sources and address those sources at the RTL or ECO stages.

Therefore, the present disclosure provides for identifying the glitch source in a given netlist and also estimating the resulting glitch power consumption value in order to rank these glitch sources based on the generated glitch power consumption. The present disclosure also provides for crossprobing of these glitch sources to the source code (RTL or gate level). The present disclosure therefore addresses designer requirements by identifying glitch sources at RTL and gate level, collating glitch sources to point to exact lines of code (RTL or gate level), ranking the glitch sources based on power use impact by each glitch source, and providing information about the glitch power consumption values of the fanout modules occurring because of a given glitch source. As a result, designers can make better informed decisions based on the ranking to re-design fewer (e.g., the top X) selected logic gates which can save most of glitch power, thus conserving computing resources to provide more power efficient circuits.

Glitch power occurs because of glitch pulses in the design of a circuit layout, which in turn occur because of differences in arrival times of input signals at various logic gates. These glitch pulses are propagated across the design adding more to the problem; propagating to downstream logic gates. Glitches are a gate level design phenomenon that can be addressed based on the gate level representation of design and timing information.

In some embodiments, the following methodology is adopted to prepare the circuit layout design for glitch source identification. Generally, the inputs of the algorithm are a synthesized gate netlist for a given circuit layout or design. During RTL-level design, the RTL is synthesized into logic gates using a fast-synthesis engine (which can be skipped for gate level design) and all the nodes in the netlist are annotated with glitch pulses using a delay shifting mechanism.

After preparing the circuit layout design, in one embodiment the design tool identifies the leaf level cells which have non-glitchy input and glitchy output (referred to herein as the glitch sources). The design tool back references these glitch sources to the RTL file and the line therein (e.g., Y=A*B will result in several instances of logic gates that are cross-related to the same RTL file and line number, and the designer is likely interested in that information). After identifying the glitch sources, in one embodiment the design tool traverses the glitch pulses in a fanout of the circuit layout and find points where glitches subside or are no longer present (referred to herein as the glitch terminuses). The design tool then calculates the power of the cells in the fanout from each glitch source to each (connected) glitch terminus. The design tool then maps the logic and power in the fanout to the source code file and line number for the associated glitch sources. In various embodiments, the design tool can also collect or calculate additional information about the fanout modules, power impacted inside the modules, and type of the cells included therein. Once the logic and power are mapped to a line in the source code, the design tool can then rank and report the glitch sources to a designer.

FIG. 1 illustrates results 100 from glitch source identification and ranking, according to embodiments of the present disclosure. The results 100 include various details of the circuit layout under analysis, which include a file path 110 for the RTL file that the layout is generated from, and an overview 120 of the glitch power consumption in the layout and a count of a number of logic gates in the layout.

The results 100 also include various details and breakdowns of the causes for the glitches in the layout, including a module analysis section 130 that identifies a name or other designation for a module, cell, or sub-layout, how many instances of that module are present in the layout, whether the module is directly or indirectly connected in the layout, and a total glitch power consumption value in the module.

In various embodiments, one or more modules can be identified in the module analysis section, including the top X modules (e.g., the X modules with the highest total glitch power consumption value in the layout), the modules that satisfy an instance threshold (e.g., that occur at least Y times in the layout), the modules that satisfy a glitch power threshold (e.g., that are responsible for at least Z % of the power consumption due to glitches), and combinations thereof. When multiple modules are listed in the module analysis section 130, the individual modules can be arranged (highest to lowest or lowest to highest) based on one or more of the total glitch power consumption associated with that module across all instances, the individual glitch power consumption value of one module, the total number of instances of the given module, whether the module is directly or indirectly connected in the layout, and combinations thereof.

Additionally, the results 100 can include a detailed analysis of the number of affected logic gates divided across families in family analysis sections 140a-d (generally or collectively, family analysis section 140). Each family analysis section 140 identifies a type of logic gate and how many instances of that logic gate appear in the layout. For example, a first family analysis 140a can identify that one AND gate (i.e., AN) appears in the layout, and a third family analysis section 140c can identify that 851 clocked AND gates (i.e., CKAN) appear in the layout. Additionally, the second family analysis 140b can identify that 34 inverters (i.e., IND 140b) appear in the layout, and a fourth family analysis 140d can identify that 784 AND/OR inverters (i.e., AOI 784) appear in the layout. In various embodiments, different identifiers can be used for the different families of logic gates and the individual logic gate families can be presented in various orders.

Figure 2:
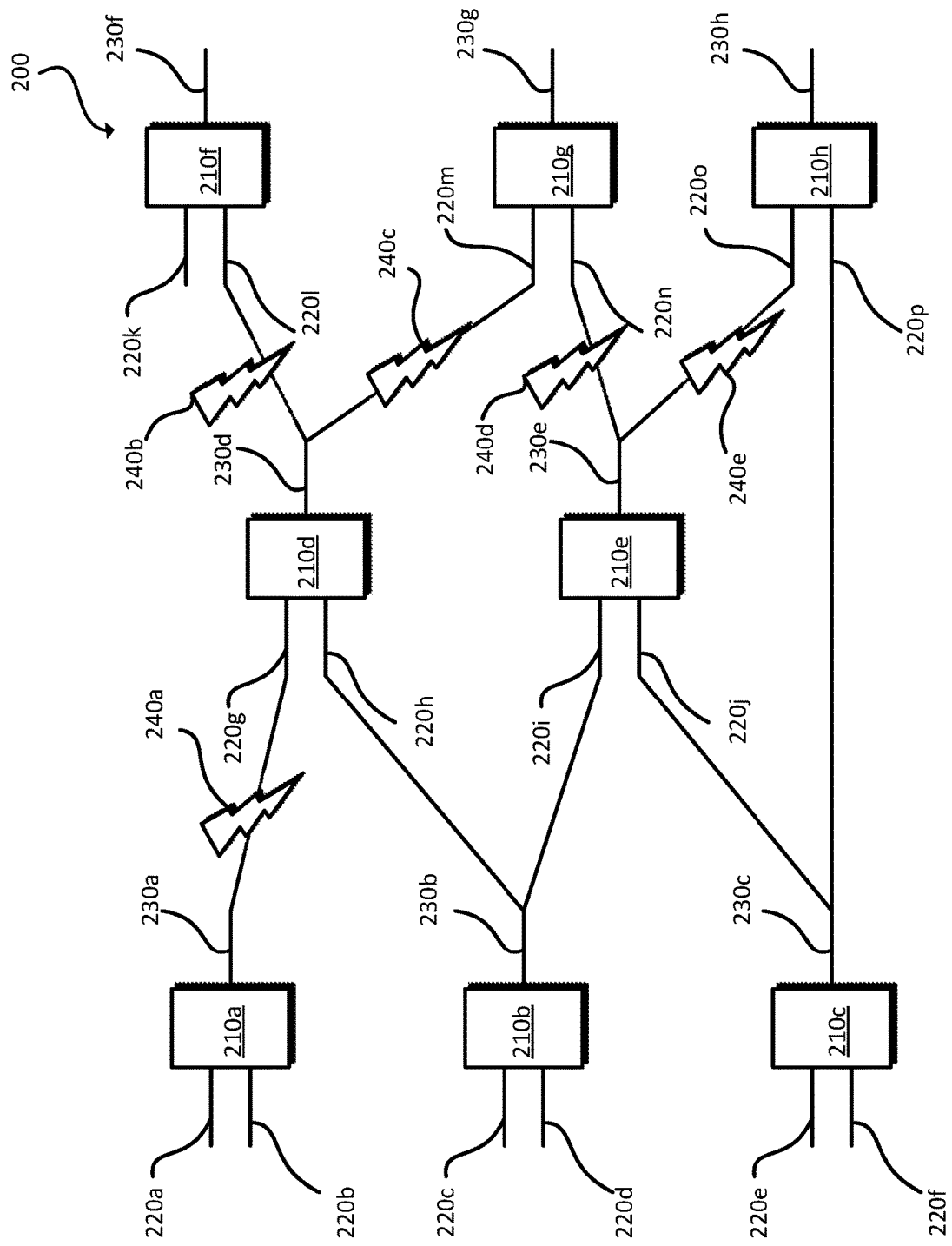
FIG. 2 illustrates an example fanout with glitch propagation, according to embodiments of the present disclosure.

FIG. 2 illustrates an example fanout 200 of a circuit design with glitch propagation, according to embodiments of the present disclosure. Several logic gates 210a-h (generally or collectively, logic gate 210) are shown in a circuit design with associated inputs 220a-p (generally or collectively, input 220) and outputs 230a-h (generally or collectively, output 230). Although shown with two inputs 220 to each logic gate 210 and one output 230 from each logic gate 210, in various embodiments a logic gate 210 can have more or fewer inputs 220 and more outputs 230 than are shown. Additionally, other circuit elements (e.g., resistors, inductors, capacitors, diodes, etc.) can be included in the circuit layout, but have been omitted from the illustrated of the fanout so as to not distract from the relationships between the logic gates 210. The logic gates 210 can be the same or different logic and can include various logic types (e.g., AND, NAND, OR, NOR, XOR, XNOR, etc.).

As shown, a first logic gate 210a receives glitch-free input signals from the first input 220a and the second input 220b, and produces an output signal on the first output 230a that includes a first glitch power consumption value 240a (generally or collectively, glitch power consumption value 240). Accordingly, the first logic gate 210a is a glitch source in the fanout. In contrast, the second logic gate 210b and the third logic gate 210c, which receive glitch-free input signals (on the third through sixth inputs 220c-f, respectively) and produce glitch-free output signals (via the second output 230b and the third output 230c), are neither glitch sources nor glitch terminuses, and may be referred to as glitch-free nodes. Glitch-free nodes are any logic gate 210 that neither receives nor outputs a signal with a glitch pulse, while glitch terminuses are logic gates 210 that receive one or more input signals with a glitch pulse, but produce output signals with no glitch power consumption.

The first glitch power consumption value 240a is propagated from the first output 230a to a fourth logic gate 210d via a seventh input 220g, and produces an output signal with a glitch pulse on the fourth output 230d that is propagated to the sixth logic gate 210f with a second glitch power consumption value 240b and to the seventh logic gate 210g with a third glitch power consumption value 240c (via the twelfth input 220l and the thirteenth input 220m, respectively). If a logic gate 210 receives one or more input signals that include a glitch power consumption value 240 and produces an output signal that includes a glitch power consumption value 240, such as the fourth logic gate 210d, that logic gate 210 may be referred to as an intermediate glitchy logic gate. In various embodiments, when a logic gate 210 outputs a glitch pulse to multiple destinations, whether as an intermediate glitchy logic gate or as a glitch source, the several output glitch powers consumption values 240 have the same magnitude.

The fifth logic gate 210e is also a glitch source, as glitch-free input signals are received from the second logic gate 210b and the third logic gate 210c (via the ninth input 220i and the tenth input 220j), and an output signal having a fourth glitch power consumption value 240d is propagated (via the fifth output 230e) to the seventh logic gate 210g with a fourth glitch power consumption value 240d and to the eighth logic gate 210h with a fifth glitch power consumption value 240e (via the fourteenth input 220n and the fifteenth input 220o, respectively).

The sixth through eighth logic gates 210f-h all receive at least one input signal including a glitch pulse, but produce output signals (via the sixth through eighth outputs 230f-h, respectively) that are free of glitch pulses. Accordingly, the sixth through eighth logic gates 210f-h may be referred to a glitch terminuses.

A pathway between two or more logic gates 210 can carry various levels of glitch power consumption values 240, and this pathway can be traced from one or more origins (e.g., the glitch sources) to one or more endpoints in the fanout (e.g., the glitch terminuses). In various embodiments, the mapped glitch power can include the glitches power consumption values 240 propagated through one or more intermediate glitchy logic gates that are located between glitch sources and glitch terminuses, so that the glitch power consumption of the intermediate glitchy logic gates are included in a corresponding glitch power consumption values calculated between the given glitch source and the given glitch terminus. For example, the total glitch power consumption value 240 propagated from the first logic gate 210a includes the first glitch power consumption value 240a, and the second glitch power consumption value 240b, and the third glitch power consumption value 240c.

When a given glitch terminus of the plurality of glitch terminuses is associated with a first glitch source and a second glitch source, the total glitch power consumption calculated for the first glitch source includes all of the calculated glitch power consumption values 240 between the first glitch source and the given glitch terminus, and a second total glitch power consumption value calculated for the second glitch source includes all of the calculated glitch power consumption values between the second glitch source and the given glitch terminus. For example, the first logic gate 210a and the fifth logic gate 210e (e.g., as a first and second glitch source), both terminate at the seventh logic gate 210g (as a given glitch terminus). Accordingly, the total glitch power consumption for the first glitch source includes the first glitch power consumption value 240a, the second glitch power consumption value 240b, and the third glitch power consumption value 240c, but does not include the fourth or fifth glitch power consumption values 240d-e, whereas a total glitch power consumption for the second glitch source includes the fourth glitch power consumption value 240d and the fifth glitch power consumption value 240e, but does not include the first through third glitch power consumption values 240a-c.

In various embodiments when a given glitch source is associated with a first glitch terminus and a second glitch terminus (or more), the corresponding total glitch power consumption for the given glitch source combines the glitch power consumption value 240 calculated between the given glitch source and each of the glitch terminuses. For example, to calculate the total glitch power consumption value 240 for glitches propagated from the fifth logic gate 210e, both the fourth glitch power consumption value 240d and the fifth glitch power consumption value 240e are added together.

Figure 3:
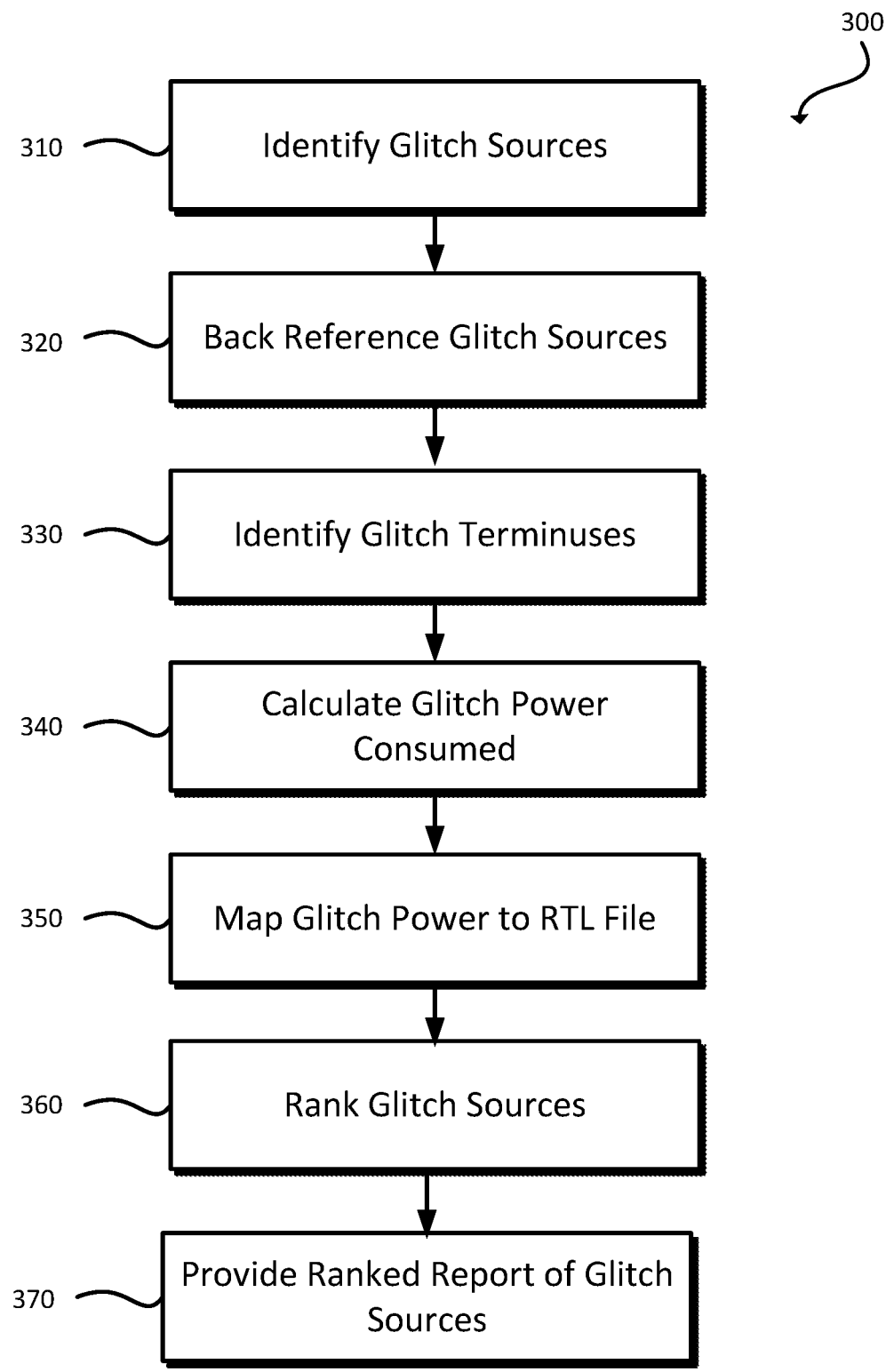
FIG. 3 is a flowchart of a method for glitch source identification and ranking, according to embodiments of the present disclosure.

FIG. 3 is a flowchart of a method 300 for glitch source identification and ranking, according to embodiments of the present disclosure. Method 300 begins at 310 where the analysis system, such as may be provided when a processing device 502 executes the instructions 526 described in relation to the computer system 500 of FIG. 5, identifies glitch sources in a layout of an electrical circuit including one or more logic gates. The glitch sources are logic gates (e.g., AND, NAND, OR, NOR, XOR, XNOR, etc.) that receive inputs that are free of glitches (i.e., spurious signal pulses), but produce outputs that include glitches and are thus the origin for a glitch pulse that may propagate to one or more glitch terminuses (potentially via one or more intermediate glitchy logic gates). The analysis system identifies the glitch sources by observing the lack of glitch power in the inputs of a given logic gate and the presence of glitch power at the outputs of the given logic gate.

At 320, the analysis system back references the plurality of glitch sources identified in 310 to corresponding lines or entries in an RTL file that defines the logic gates that define the plurality of glitch sources identified. Once identified and back-referenced to the RTL file, the analysis system can associate the glitch power consumption values that are measured from the individual glitch sources to the corresponding glitch terminuses thereof to present the traced glitch power consumption value to a developer.

At 330, the analysis system identifies a plurality of glitch terminuses in the circuit layout. To identify the glitch terminuses, the analysis system traces the glitch pulses from the glitch sources through the fanout to other logic gates (i.e., intermediate glitchy logic gates) until the glitch pulse subsides at a logic gate (i.e., a glitch terminus). The glitch terminuses include logic gates that receive inputs that include glitch pulses, but produce outputs that are free of glitches (e.g., that do not include glitch pulses and are thus glitch-free). In various embodiments, each glitch source can fan out to one or more glitch terminuses, and each glitch terminus can receive inputs from one or multiple glitch sources. Accordingly, a fanout from an individual glitch source can include one or more paths through the layout that can each include 0-n non-logic gate components, 0-m intermediate glitchy logic gates (that receive glitchy inputs and produce glitchy outputs), and one glitch terminus. For example, with reference to FIG. 2, a first path contains the first logic gate 210a, the fourth logic gate 210d, and the sixth logic gate 210f, while a second path contains the first logic gate 210a, the fourth logic gate 210d, and the seventh logic gate 210g.

At 340, the system calculates the glitch power consumed from each of the glitch sources to each of the one or more glitch terminuses that receive inputs that can be traced back to a given glitch source. The system sums the power consumed due to the glitch pulses along each path from each individual glitch source to the one or more corresponding glitch terminuses to calculate a total glitch power associated with each individual glitch source.

For example, with reference to FIG. 2, the calculated power for the first glitch source originating at the first logic gate 210*a* includes the first glitch power consumption value 240*a* (between the first logic gate 210*a* and the fourth logic gate 210*d*), a first instance of the second glitch power consumption value 240*b* (between the fourth logic gate 210*d* and the sixth logic gate 210*f*), and a second instance of the second glitch power consumption value 240*b* (between the fourth logic gate 210*d* and the seventh logic gate 210*g*). Similarly, with reference again to FIG. 2, the calculated power for a second glitch source originating at the fifth logic gate 210*e* includes the second glitch power consumption value 240*c* provided to the seventh logic gate 210*g* (as a first glitch terminus) and the eighth logic gate 210*h* (as a second glitch terminus 230*h*).

At 350, the analysis system maps the glitch power consumption values calculated per 340 to the lines in the RTL file in which the corresponding logic gates are defined. In various embodiments where a given line acts as a class or family definition for several instances of a logic gate that is repeated throughout the circuit layout, the combined glitch power consumption values measured from the several instances are mapped to the class or family definition.

At 360, the analysis system ranks the glitch sources based on a magnitude of glitch power consumption value traced outward from the glitch sources to the corresponding one or more glitch terminuses. For example, with reference to FIG. 2, when the glitch power consumption value from the first logic gate 210*a* to the sixth logic gate 210*f* and the seventh logic gate 210*g* is X and the glitch power consumption value from the fifth logic gate 210*e* to the seventh logic gate 210*g* and the eighth logic gate is 2X, the analysis system ranks the effect of the fifth logic gate 210*e* as a glitch source over the effect of the first logic gate 210*a* as a glitch source.

At 370, the analysis system provides a ranked report of the glitch sources that identifies the glitch sources in an order based on magnitude of glitch power consumption value associated with the fanout from each of the glitch sources. In various embodiments, the ranked report identifies lines in an RTL file defining each of the glitch sources, and lists the glitch sources associated with higher glitch power consumption values before listing the glitch sources associated with lower glitch power consumption values.

Once the analysis system provides the report provided to a designer, the designer may adjust various setting in the circuit layout to reduce the amount of glitch power consumed in the design. Because the report can be ranked according to various criteria, the designer can quickly identify which logic gates or families of logic gates are the origins of the most glitch power, and thereby devote resources to reducing or removing the effect of these logic gates first. Accordingly, the analysis system improves the speed and functionality of circuit design tools, and reduces the computing resources needed to adjust such computer-based circuit layout designs to improve power efficiency therein. Method 300 may then conclude or repeat again from 310, as the adjustments made by the designer may eliminate or shift glitch sources in the layout, which may require further analysis.

Various features are described herein with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

Also, various terms are used herein as used in the art. For example, "optimization", "optimize", and "optimizing" refer, as used in the art and as understood by a person having ordinary skill in the art, to a mathematical formulation of a problem to select some improvement (if an improvement is available), within the structure of the algorithm implemented, of some identified characteristic, and do not imply an absolute or global optimal (as the term is more colloquially used) improvement of the characteristic. For example, in some situations where optimizing may determine a minimum, the minimum may be a local minima rather than the global minimum.

A person having ordinary skill in the art will readily understand various data structures that may be implemented in the processes described herein. For example, a class of mask objects can be defined for polygons and/or edges of polygons of a mask pattern. Similarly, a database or other storage structure can be implemented to store data of a PLT, Jacobian matrix, and/or CFG. Different data structures and/or modified data structures can be used in different examples.

Additionally, a person having ordinary skill in the art will readily understand various modifications to the logical and/or mathematical expressions of examples described herein. For example, different cost functions and/or approximations can be defined and used for calculations. Further, terms such as vector, table, and matrix are generally thought of as mathematical expressions, and related terms, such as column and row, similarly can be organizations within a mathematical expression and can be changed to different organizations. Other examples contemplate such modifications.

Figure 4:
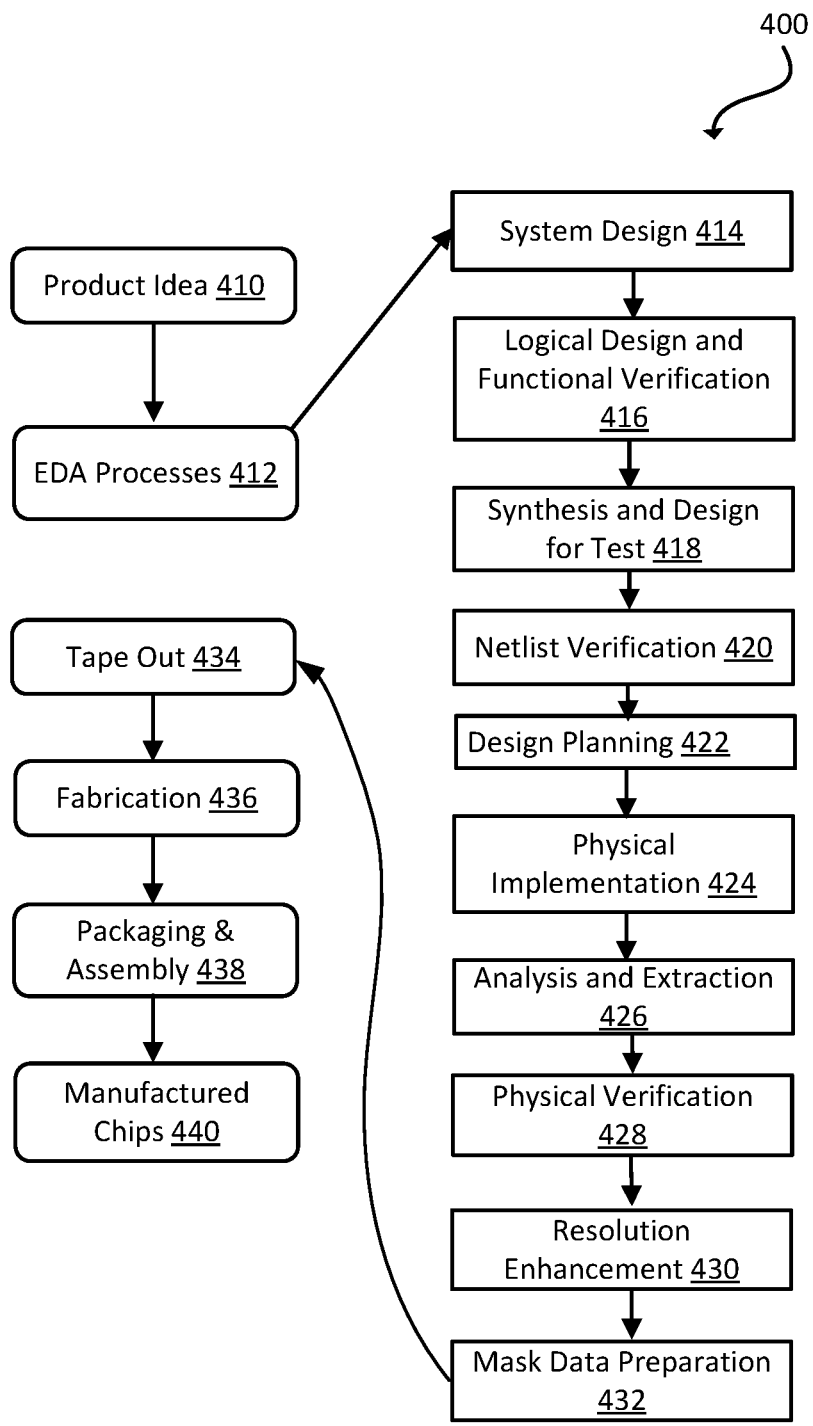
FIG. 4 depicts a flowchart of various processes used during the design and manufacture of an integrated circuit in accordance with some examples of the present disclosure.

FIG. 4 illustrates an example set of processes 400 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at 410, with the creation of a product idea with information supplied by a designer, information that is transformed to create an integrated circuit that uses a set of EDA processes, at 412. When the design is finalized, the design is taped-out, at 434, which is when artwork (e.g., geometric patterns) for the integrated circuit is sent to a fabrication facility to manufacture the mask set, which is then used to manufacture the integrated circuit. After tape-out, at 436, the integrated circuit is fabricated on a semiconductor die, and at 438, packaging and assembly processes are performed to produce, at 440, the finished integrated circuit (oftentimes, also referred to as "chip" or "integrated circuit chip").

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower representation level that is a less representative description adds more useful detail into the design description, such as, for example, more details for the modules that include the description. The lower levels of representation that are less representative descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described may be enabled by EDA products (or tools).

During system design, at 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at 418, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at 420, the netlist is checked for compliance with timing constraints and for correspondence with the HDL code. During design planning, at 422, an overall floor plan for the integrated circuit is constructed and analyzed for timing and top-level routing.

During layout or physical implementation, at 424, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at 426, the circuit function is verified at the layout level, which permits refinement of the layout design. During physical verification, at 428, the layout design is checked to ensure that manufacturing constraints are correct, such as design rule check (DRC) constraints, electrical constraints, lithographic constraints, and that circuitry function matches the HDL design specification. During resolution enhancement, at 430, the geometry of the layout is transformed to improve how the circuit design is manufactured.

During tape-out, data is created to be used (after lithographic enhancements are applied if appropriate) for production of lithography masks. During mask data preparation, at 432, the tape-out data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
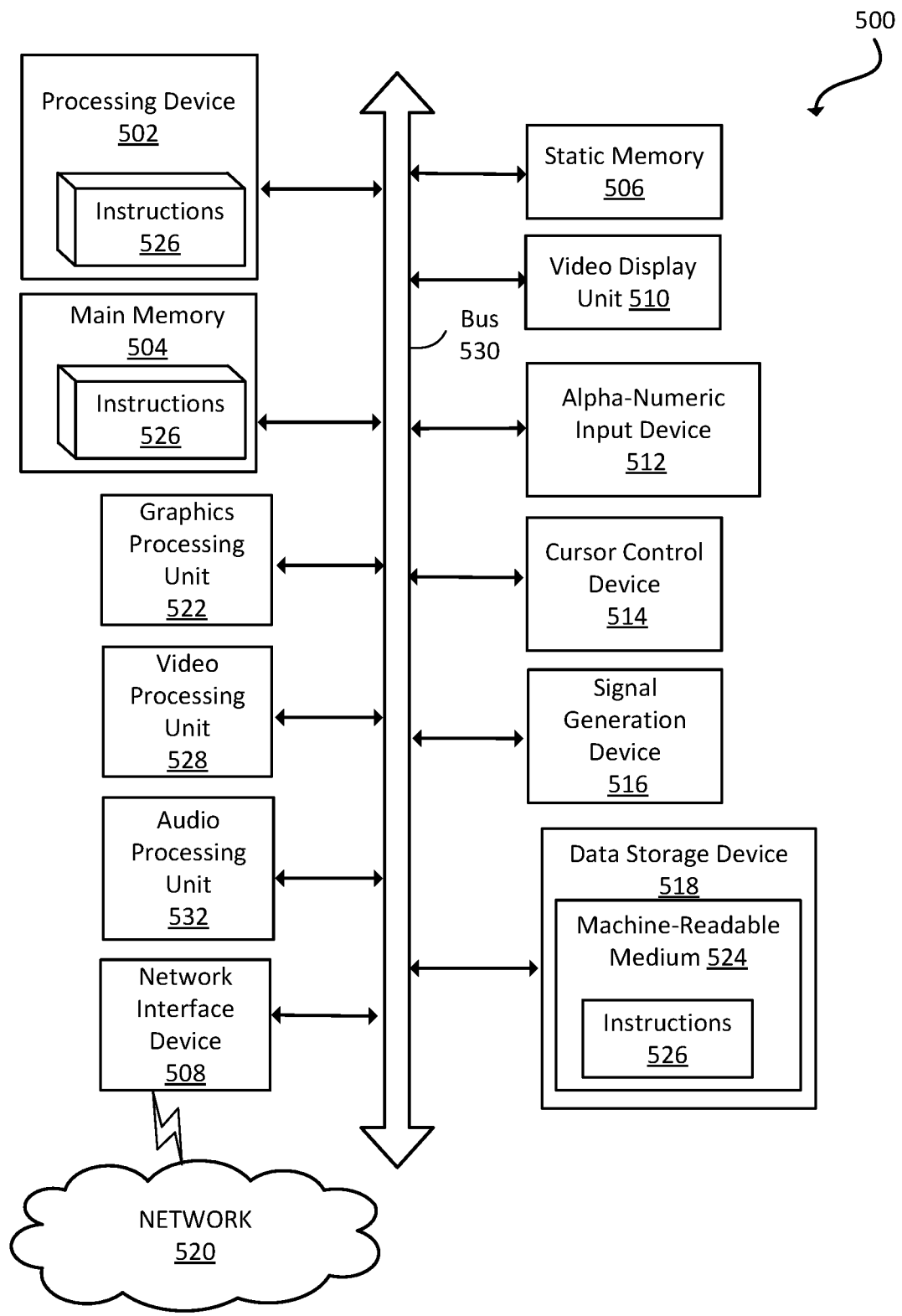
FIG. 5 depicts a diagram of an example computer system in which examples of the present disclosure may operate.

FIG. 5 illustrates an example of a computer system 500 within which a set of instructions, for causing the computer system to perform any one or more of the methodologies discussed herein, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530. The main memory 504 includes or is a non-transitory computer readable medium. The main memory 504 (e.g., a non-transitory computer readable medium) can store one or more sets of instructions 526, that when executed by the processing device 502, cause the processing device 502 to perform some or all of the operations, steps, methods, and processes described herein.

Processing device 502 represents one or more processors such as a microprocessor, a central processing unit, or the like. More particularly, the processing device 502 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing some or all of the operations, steps, methods, and processes described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (e.g., a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also including machine-readable storage media.

In some implementations, the instructions 526 include instructions to implement functionality described above. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 502 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   identifying a plurality of glitch sources in a circuit layout, the plurality of glitch sources associated with glitches that correspond to signals arriving at logic gates of the circuit layout at different times;
   back referencing the plurality of glitch sources to determine corresponding lines in a Resistor Transistor Logic (RTL) file, the corresponding lines define logic gates associated with the plurality of glitch sources;
   identifying, in the circuit layout, a plurality of glitch terminuses associated with the plurality of glitch sources by tracing glitch pulses from the plurality of glitch sources through fanouts within the circuit layout, wherein each of the plurality of glitch sources is associated with at least one of the plurality of glitch terminuses;
   determining a plurality of glitch power consumption values associated with the plurality of glitch sources based on the fanouts in the circuit layout extending from the plurality of glitch sources to the plurality of glitch terminuses;
   ranking, by a processor, the plurality of glitch sources based on corresponding glitch power consumption values of the plurality of glitch power consumption values corresponding to individual glitch sources of the plurality of glitch sources; and
   reporting the corresponding lines in the RTL file associated with the ranked plurality of glitch sources.

2. The method of claim 1, wherein the plurality of glitch sources are logic gates in the circuit layout that receive glitch-free inputs and produce outputs including glitch pulses.

3. The method of claim 1, wherein the plurality of glitch terminuses are logic gates that receive at least one input that include glitch pulses and produce outputs that are glitch-free.

4. The method of claim 1, wherein a given glitch source of the plurality of glitch sources is associated with a first glitch terminus and a second glitch terminus of the plurality of glitch terminuses, wherein a corresponding glitch power consumption value for the given glitch source combines a first glitch power consumption value calculated between the given glitch source and the first glitch terminus with a second glitch power consumption value calculated between the given glitch source and the second glitch terminus.

5. The method of claim 1, wherein a given glitch terminus of the plurality of glitch terminuses is associated with a first glitch source and a second glitch source of the plurality of glitch sources, wherein a first glitch power consumption value calculated for the first glitch source includes all of the determined glitch power consumption values between the first glitch source and the given glitch terminus, and wherein a second glitch power consumption value calculated for the second glitch source includes all of the determined glitch power consumption values between the second glitch source and the given glitch terminus.

6. The method of claim 1, wherein at least one intermediate glitchy logic gate is located between a given glitch source of the plurality of glitch sources and a given glitch terminus of the plurality of glitch terminuses in the circuit layout, wherein power consumption of the at least one intermediate glitchy logic gate is includes in a corresponding glitch power consumption value calculated between the given glitch source and the given glitch terminus.

7. The method of claim 1, wherein a first glitch source and a second glitch source of the plurality of glitch sources are both associated with a first glitch terminus and a second glitch terminus of the glitch terminuses, wherein a first glitch power consumption value calculated for the first glitch source includes all of the determined glitch power consumption values between the first glitch source and the first glitch terminus and between the first glitch source and the second glitch terminus, and wherein a second glitch power consumption value calculated for the second glitch source includes all of the determined glitch power consumption values between the second glitch source and the first glitch terminus and between the second glitch source and the second glitch terminus.

8. A non-transitory computer-readable storage medium including instructions that when executed by a processor enable performance of a method, comprising:
   identifying a plurality of glitch sources in a circuit layout, the plurality of glitch sources associated with glitches that correspond to signals arriving at logic gates of the circuit layout at different times;
   back referencing the glitch sources to determine corresponding lines in a Resistor Transistor Logic (RTL) file, the corresponding lines define logic gates associated with the glitch sources;
   identifying, in the circuit layout, glitch terminuses associated with the glitch sources by tracing glitch pulses from the glitch sources through fanouts within the circuit layout, wherein each of the glitch sources is associated with at least one of the glitch terminuses;
   determining glitch power consumption values associated with the glitch sources based on the fanouts in the circuit layout extending from the glitch sources to the glitch terminuses;
   ranking the glitch sources based on corresponding glitch power consumption values of the glitch power consumption values corresponding to individual glitch sources of the glitch sources; and
   providing the corresponding lines in the RTL file associated with the ranked glitch sources.

9. The computer-readable storage medium of claim 8, wherein the glitch sources are logic gates that receive input free of glitches and produce output that include glitches.

10. The computer-readable storage medium of claim 8, wherein the glitch terminuses are logic gates that receive input that include glitches and produce output free of glitches.

11. The computer-readable storage medium of claim 8, wherein at least one glitch source of the glitch sources is associated with more than one glitch terminus of the glitch terminuses.

12. The computer-readable storage medium of claim 8, wherein at least one glitch terminus of the glitch terminuses receives inputs originating from more than one glitch source of the glitch sources.

13. A system comprising:
   a memory storing instructions; and
   a processor, coupled with the memory and to execute the instructions, the instructions when executed cause the processor to:
      identify a plurality of glitch sources in a circuit layout, the glitch sources associated with glitches that correspond to signals arriving at logic gates of the circuit layout at different times;
      back reference the glitch sources to determine corresponding lines in a Resistor Transistor Logic (RTL) file, the corresponding lines define logic gates associated with the glitch sources identify, in the circuit layout, glitch terminuses associated with the glitch sources by tracing glitch pulses from the plurality of glitch sources through fanouts within the circuit layout, wherein each of the plurality of glitch sources is associated with at least one of plurality of glitch terminuses;

determine glitch power consumption values associated with the glitch sources based on the fanouts in the circuit layout extending from the glitch sources to the glitch terminuses;

ranking the glitch sources based on corresponding glitch power consumption values of the glitch power consumption values corresponding to individual glitch sources of the glitch sources; and provide the corresponding lines in the RTL file associated with the ranked glitch sources.

14. The system of claim 13, wherein the glitch sources are logic gates that receive input free of glitches and produce output that include glitch power.

15. The system of claim 13, wherein the glitch terminuses are logic gates that receive input that include glitch power and produce output free of glitches.

16. The system of claim 13, wherein at least one glitch source of the glitch sources is associated with more than one glitch terminus of the glitch terminuses.

17. The system of claim 13, wherein at least one glitch terminus of the glitch terminuses receives inputs originating from more than one glitch source of the glitch sources.

18. The system of claim 13, wherein at least one glitch source of the glitch sources is traced to at least one corresponding glitch terminus of the glitch terminuses via at least one intermediate glitchy logic gate.

19. The computer-readable storage medium of claim 8, wherein a first glitch terminus of the glitch terminuses is associated with a first glitch source and a second glitch source of the glitch sources, wherein a first glitch power consumption value of the glitch power consumption values determined for the first glitch source includes all of the glitch power consumption values between the first glitch source and the first glitch terminus, and wherein a second glitch power consumption value of the glitch power consumption values determined for the second glitch source includes all of calculated glitch power consumption values between the second glitch source and the first glitch terminus.

20. The computer-readable storage medium of claim 8, wherein at least one intermediate glitchy logic gate is located between a first glitch source of the glitch sources and a first glitch terminus of the glitch terminuses in the circuit layout, wherein power consumption of the at least one intermediate glitchy logic gate is includes in a corresponding glitch power consumption value of the glitch power consumption values determined between the first glitch source and the first glitch terminus.

* * * * *